Aug. 26, 1952    J. L. SEARLE    2,608,402
LUBRICATING STRUCTURE FOR LEAF SPRINGS
Filed Nov. 7, 1949    2 SHEETS—SHEET 1
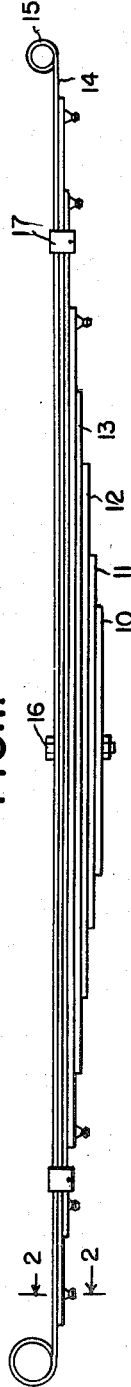
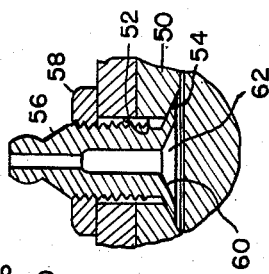
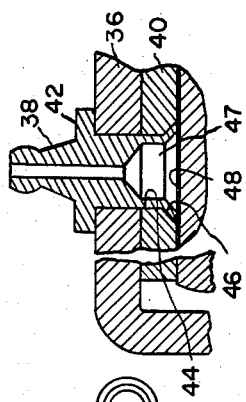
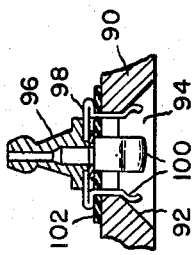
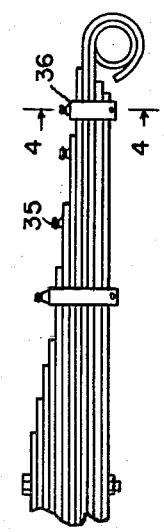
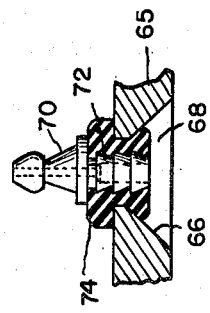
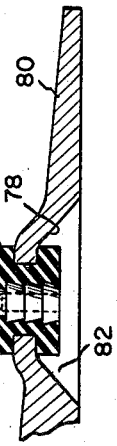
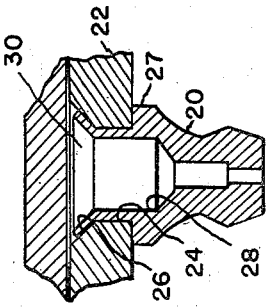
*INVENTOR.*
JOHN L. SEARLE
BY
Whittemore Hulbert & Belknap
ATTORNEYS Aug. 26, 1952      J. L. SEARLE      2,608,402
LUBRICATING STRUCTURE FOR LEAF SPRINGS
Filed Nov. 7, 1949      2 SHEETS—SHEET 2
FIG.10
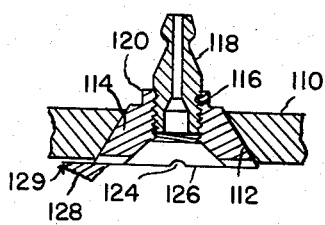
FIG.9.
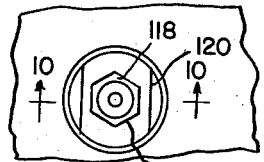
FIG.12.
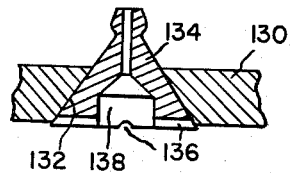
FIG.11.
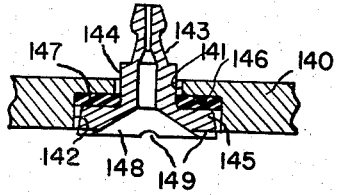
FIG.13.
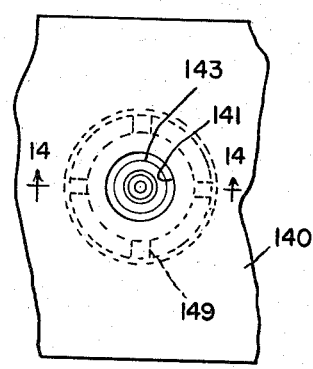
FIG.14.
FIG.15.
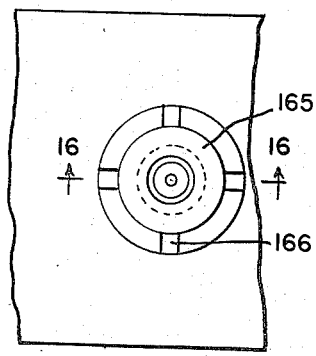
FIG.16.
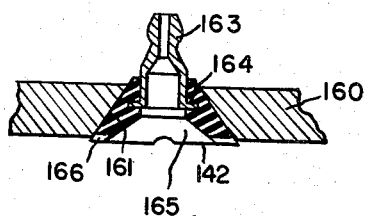
INVENTOR.
JOHN L. SEARLE
BY
*Whittemore Hulbert & Belknap*
ATTORNEYS Patented Aug. 26, 1952

2,608,402

UNITED STATES PATENT OFFICE 2,608,402

LUBRICATING STRUCTURE FOR LEAF SPRINGS

John L. Searle, Detroit, Mich., assignor to Detroit Steel Products Company, Detroit, Mich., a corporation of Michigan Application November 7, 1949, Serial No. 125,910

10 Claims. (Cl. 267—50)

The present invention relates to lubricating structure for leaf springs and more particularly, leaf springs of the type used in automotive vehicles.

It is an object of the present invention to provide a positive simple lubricating structure for introducing lubricant between the contacting surfaces of leaf springs, particularly the areas thereof adjacent the ends of the leaf springs.

It is a further object of the present invention to provide grease fittings for applying lubricant under pressure to leaf springs.

It is a further object of the present invention to provide a leaf spring construction including means providing a reservoir intermediate adjacent leaf springs and adjacent the end thereof.

It is a further object of the present invention to provide a grease fitting in combination with means for securing the grease fitting to a leaf spring in a manner to form a grease receiving reservoir between such leaf spring and the next adjacent leaf spring of an assembly.

It is a further object of the present invention to provide leaf springs in combination with grease fittings secured in openings in the leaf springs in which the grease fittings are permanently secured to the leaf springs.

It is a further object of the present invention to provide grease fittings secured to openings formed in leaf springs in which the grease fittings are inserted through the openings and are retained in place by the next adjacent leaf spring after the leaf springs have been assembled.

It is a further object of the present invention to provide a grease fitting applied to an opening in a leaf spring which is removable and replaceable after the leaf spring has been assembled with others.

Other objects and features of the invention will become apparent as the description proceeds, especially when taken in conjunction with the accompanying drawings, wherein:

Figure 1 is a front elevation of a leaf spring assembly.

Figure 2 is an enlarged fragmentary section on the line 2—2, Figure 1.

Figure 3 is a fragmentary front elevation showing one end of a leaf spring assembly.

Figure 4 is an enlarged fragmentary section on the line 4—4, Figure 3.

Figure 5 is a fragmentary section through a grease fitting applied to a leaf spring.

Figure 6 is a view similar to Figure 5 illustrating a modified grease fitting and assembly means therefor.

Figure 7 is a view similar to Figure 5 showing another modified grease fitting and assembly means therefor.

Figure 8 is a view similar to Figure 5 showing still another modified grease fitting and assembly means therefor.

Figure 9 is a plan view of a modified form of grease fitting.

Figure 10 is a section on the line 10—10, Figure 9.

Figure 11 is a bottom plan view of another modified form of grease fitting.

Figure 12 is a section on the line 12—12, Figure 11.

Figure 13 is a plan view of yet another modified form of grease fitting.

Figure 14 is a section on the line 14—14, Figure 13.

Figure 15 is a bottom plan view of yet another modified form of grease fitting.

Figure 16 is a section on the line 16—16, Figure 15.

Referring now to the drawings, a spring assembly of the type referred to is illustrated in Figure 1 and is composed of a plurality of leaves running from a short central leaf 10 through the progressively longer leaves 11, 12, 13, etc., to the upper leaf 14 which is longest of the set and which is provided at each end with eyes 15 for attachment to the shackles of the vehicle frame. The assembly of leaves is provided with a center bolt 16 which holds the leaves together before installation and serves as a locating dowel after installation. Clips 17 are used adjacent the ends of some of the leaves to hold them in alignment and prevent them from spreading.

When the spring assembly is installed on a vehicle it assumes an approximate straight condition under load as illustrated in the figure. In the operation of the vehicle the spring flexes up and down with a resultant relative movement between adjacent leaves longitudinally thereof. This relative motion is at a minimum or is zero at the center bolt and is a maximum for each leaf adjacent its ends. Accordingly, the maximum frictional resistance of the contacting rubbing surfaces occurs at the areas adjacent the leaf ends, causing wear and in some cases objectionable squeaking noises.

It has long been recognized that lubrication between rubbing surfaces adjacent the ends of leaf springs is desirable. It has been suggested in the past to provide grease fittings for introducing grease into the spring assembly and to provide interconnecting holes adjacent leaf sections to allow the lubricant to circulate to the several contacting surfaces. This method has proved impractical however, since under service conditions satisfactory lubrication of all of the surfaces is not obtained. It has also been suggested to provide oil impregnated liners or inserts between spring sections and to provide metal spring covers. Many of the previously suggested devices for obtaining this result are not acceptable because they add excessively to the cost of the spring asembly. Others are not acceptable because they fail to provide positive lubrication at the critical areas.

According to the present invention a separate grease fitting is provided adjacent the end of each leaf spring where lubrication is essential. While in theory it is desirable to provide a single fitting for introducing lubricant to a plurality of leaf spring zone ends, practical experience has indicated that this result cannot be obtained. Accordingly, a separate grease fitting is applied to the end of each leaf spring which it is desired to lubricate. Moreover, by providing grease fittings of the pressure type the possibility that lubrication will be overlooked during periodic lubrication of the vehicle is minimized. The several fittings illustrated in the drawings have the common feature that each allows direct lubrication of the areas at the ends of the leaves at a minimum of cost. The nipple of the fitting is made for use with a standard service station grease gun. The specific structural arrangement by which the grease fittings are applied to the leaves of the spring results in the formation of a reservoir in which a substantial quantity of lubricant is retained and from which reservoir such lubricant may move during use in order to keep the leaf spring assembly lubricated in the most efficient manner.

In general, the fittings illustrated in the drawings may be subdivided into three classes which will be discussed separately. In the first place the fittings illustrated in Figures 2–5 are permanently secured to a single leaf spring. In the embodiments of the invention illustrated in Figures 6–10 the fittings are detachable from the leaf spring in which they are mounted while the leaf spring remains in assembly. The modifications of the invention illustrated in Figures 12–16 are received in openings in a single leaf spring and are retained therein by engagement with the next adjacent leaf of the assembly. In this type therefore, in order to remove and replace a fitting it is necessary to disassemble the spring assembly or at least to move the portion of the leaf which supports the fitting away from the next adjacent leaf spring.

Referring now to Figure 2 the fitting 20 is received within an opening formed in a leaf spring 22, the opening having a cylindrical portion 24 and a conical portion 26. The fitting 20 has an annular flange 27 seated against the outer surface of the leaf 22 and a laterally enlarged reservoir 28 bounded at its shoulders by relatively thin walls which are swaged or otherwise formed to engage the adjacent wall surfaces 24 and 26 in the leaf spring. There is thus provided a lubricant reservoir 30 of substantial size, the sides of this reservoir being formed in part by the fitting and in part by the opening through the leaf spring 22, and the end of the reservoir being closed by the adjacent surface of the next adjacent leaf spring. The fitting 20 is thus permanently attached to the leaf spring 22.

Referring now to Figures 3 and 4 there is illustrated a leaf spring assembly provided with a plurality of fittings 35 which may be of the type illustrated in Figure 2. In addition, the assembly includes a plurality of clips 36. In this case the grease fitting 38 extends through the clips 36 and through the next adjacent leaf spring illustrated here as 40. The fitting 38 is provided with an outwardly extending flange 42 forming a shoulder adapted to seat on the outer surface of the clip 36. The leaf spring 40 has an opening therethrough including a cylindrical portion 44 and a conical portion 46. The fitting 38 adjacent its inner end has a thin walled reservoir 47 formed therein, the walls of the reservoir being swaged or otherwise formed outwardly to interlock the fitting with the clip 36 and the leaf spring 40. The adjacent surfaces of the leaf spring 40 and the next lower spring are bowed transversely to leave space 48 therebetween through which grease flows longitudinally of the spring assembly.

Referring now to Figure 5 there is illustrated a modified form of fitting. In this case the leaf spring 50 has an opening 52 provided therein which may if desired be threaded. Adjacent the inner side of the leaf spring 50 the opening 52 flares outwardly to provide conically shaped walls 54. The fitting 56 is provided with threads on its exterior and may be retained in place by a lock nut 58. The inner end of the fitting has an outwardly flared skirt portion 60 which serves as a stop. The formation provides a laterally enlarged lubricant reservoir 62.

Referring now to Figure 6 there is illustrated a lubricant fitting which is adapted to be removable and replaceable without disturbing the assembly of leaf springs. In this case a leaf spring 65 is provided with an opening 66 therethrough which is outwardly tapered at the inner side as shown to provide a laterally enlarged lubricant reservoir 68. The lubricant fitting 70 has a stem portion 72 which is serrated with teeth as illustrated. In order to retain the fitting 70 in the opening 66 a grommet 74 of a suitable resilient material is provided. Conveniently, the grommet may be formed of neoprene or other oil resistant synthetic rubber. The teeth on the stem 72 are such that the fitting 70 may be introduced into the resilient grommet 74 by the application of pressure and is retained therein by engagement between the teeth of the stem and the grommet. However, despite the greater resistance offered to withdrawal of the fitting from the grommet, it may if desired be removed or if damaged and lost it may be readily replaced.

The modification illustrated in Figure 7 is similar to that shown in Figure 6 and differs primarily in the manner in which the opening 78 is provided in the leaf spring 80. In this case the metal surrounding the opening 78 and the leaf spring is shaped outwardly so as to provide a reservoir 82 of substantially increased size. In this case the fitting 84 is secured in a grommet 86 in substantially the same manner as that illustrated in Figure 6.

Referring now to Figure 8 there is illustrated a modified arrangement in which the leaf spring 90 is provided with the opening 92 having outwardly tapered sides adjacent its inner surface to provide a lubricant receiving reservoir 94. The grease fitting 96 carries a collar 98 having a plurality of depending resilient fingers 100, the lower portions of these fingers being bent outwardly to retain the finger in place by engagement with the tapered walls of the opening 92. A suitable washer is illustrated at 102 and serves to seal the reservoir 94.

Referring now to Figures 9 and 10 there is illustrated an arrangement in which the spring 110 is provided with a conically tapered opening 112 for the reception of a corresponding tapered plug 114. The plug 114 is provided with an internally threaded bore 116 for the reception of the grease fitting 118. The plug 114 has a flat sided neck 120 and the fitting 118 may be of hexagonal shape as indicated at 122 so that the fitting may be removed from the plug 114. In order to facilitate radially outward flow of grease under pressure or under conditions encountered in use, the lower surface of the plug 114 is provided with a plurality of radially extending channels 124. In use, the plug 114 is retained in position by engagement with an underlying leaf spring which also serves to close the oil reservoir 126 provided therebetween. The channels 124 as previously described, permit outward flow of lubricant from the reservoir 126. The plug 114 and the hole into which it fits may be of circular cross-section, or of non-circular cross-section, such as square to prevent rotation of the plug in the hole. The plug 114 extends below the lower surface of the spring 110 to engage the upper surface of the next adjacent leaf spring, a portion of which is illustrated at 128. Lubricant flows out of channels 124 into the space 129 between the springs.

Referring now to Figures 11 and 12 there is illustrated an arrangement in which the leaf spring 130 is provided with a conically tapered opening 132 therethrough. In this case the grease fitting comprises a single element 134, the lower portion of which is conically formed to fit within the conical opening in the leaf spring 130. Again, radially extending channels 136 are provided at the underside of the fitting 134 to permit outward flow of lubricant from the central lubricant reservoir 138.

Referring now to Figures 13 and 14 there is illustrated an arrangement in which a leaf spring 140 is provided with an opening therethrough comprising a smaller upper portion 141 and an enlarged bottom portion 142. The fitting 143 is received within the opening and comprises a neck portion 144 extending through the smaller opening 142 and a bottom portion 145 received within the enlarged portion 142 of the opening. Intermediate the top of the enlarged portion 145 of the fitting and an overlying shoulder portion 146 of the spring is a sealing gasket 147. The underside of the fitting 143 includes a conically shaped reservoir portion 148 and in addition, the radially extending channels 149 are provided for the flow of lubricant out of the reservoir 148.

Referring now to Figures 15 and 16 there is illustrated an arrangement in which the spring 160 has a downwardly and outwardly tapered conical opening 161. Suitably received within this opening is a plug 162 which may be formed of a suitable compressible material such for example as an oil resistant synthetic rubber. The fitting 163 has an outwardly extending flange 164 embedded in the plug 162. The inner portion of the plug 162 is laterally enlarged to provide a lubricant receiving reservoir 165 and its lower surface is provided with a plurality of radially extending passages 166 for outward flow of lubricant from the reservoir. Again, this fitting is inserted from the inner side of the leaf spring 160 prior to assembly and is retained in position therein by the next adjacent leaf spring engaging the under-surface of the plug 162.

In general, the opening in the leaf spring in which the fittings are secured may be punched therein and in some cases they may be countersunk as shown. In cases where the thickness of the leaf spring is insufficient to permit countersinking, the material of the spring surrounding the opening may be formed upwardly.

It may be mentioned at this time that leaf springs for vehicles of the type described herein are normally provided with a slight transverse camber or dish which further facilitates lubrication in that it tends to direct lubricant applied under pressure between the springs longitudinally thereof.

Fittings may be made of any suitable material, but excellent results are obtained when aluminum silicon bronze is employed.

Springs supplied with fittings of the type disclosed herein will be lubricated as a matter of course whenever the vehicle is given a general lubrication. The fittings are extremely economical and do not add appreciably to the cost of the spring assembly although they improve its utility and result in longer life than would otherwise be the case.

While reference is made to upwardly extending fittings to simplify the description it will be understood that in reversed spring assemblies of the type shown in Figure 1, the various elements are merely inverted. So also in full elliptical springs, fittings on one part will be inverted with respect to fittings on the other part.

The drawings and the foregoing specification constitute a description of the improved lubricating structure for leaf springs in such full, clear, concise and exact terms as to enable any person skilled in the art to practice the invention, the scope of which is indicated by the appended claims.

What I claim as my invention is:

1. Spring construction for motor vehicles comprising an assembly of leaf springs of progressively stepped lengths, means for applying lubrication under pressure to the surfaces adjacent the end of a shorter leaf and the contiguous surface of the next longer leaf, said shorter leaf having a transverse opening therethrough adjacent its end, said opening being flared at its end next to the longer leaf, said means comprising a pressure grease fitting in said opening, said means having a portion extending above said shorter leaf and a portion within said opening extending laterally to bear against the flared surface surrounding said opening, the portion of said fitting above said shorter leaf being dimensioned to pass through said opening to provide for removal of said fitting upon disassembly of said shorter and longer leaf.

2. Spring construction for motor vehicles comprising an assembly of leaf springs of progressively stepped lengths, means for applying lubrication under pressure to the surfaces adjacent the end of a shorter leaf and the contiguous surface of the next longer leaf, said shorter leaf having a transverse opening therethrough adjacent its end, said opening being flared at its end next to the longer leaf, said means comprising a pressure grease fitting in said opening, and an adaptor separate from said fitting, said adaptor including means releasably securing said adaptor in said opening.

3. Structure as defined in claim 2, said adaptor being formed of resilient material including laterally extending portions above and below said opening to retain said adaptor in said opening, and being distortable to provide for removal of said adaptor from said opening.

4. Structure as defined in claim 3, said fitting including a portion releasably secured in said adaptor to provide for removal of said fitting from said adaptor.

5. Structure as defined in claim 3, said adaptor having an opening therethrough, and said fitting having a serrated stem removably secured in the opening in said adaptor.

6. Structure as defined in claim 3, said adaptor being formed of rubber.

7. Spring construction for motor vehicles comprising an assembly of leaf springs of progressively stepped lengths, means for applying lubrication under pressure to the surfaces adjacent the end of a shorter leaf and the contiguous surface of the next longer leaf, said shorter leaf having a transverse opening therethrough adjacent its end, said opening being flared at its end next to the longer leaf, the wall portion surrounding said opening being of reduced thickness and formed outwardly of the plane of said leaf to provide an enlarged lubricant reservoir, said means comprising a resilient generally tubular adaptor received in said opening having laterally extending portions at both ends of said opening to retain said adaptor in said opening, a pressure grease fitting having a serrated stem in said adaptor, said adaptor and fitting being removable by distortion of the material of said adaptor from said opening, and said fitting being removable and replaceable from said adaptor.

8. Structure as defined in claim 7 in which the inner end of said fitting and adaptor are spaced substantially from the adjacent surface of said longer leaf.

9. Spring construction for motor vehicles comprising an assembly of leaf springs of progressively stepped lengths, means for applying lubrication under pressure to the surfaces adjacent the end of a shorter leaf and the contiguous surface of the next longer leaf, said shorter leaf having a transverse opening therethrough adjacent its end, said opening being flared at its end next to the longer leaf, said means comprising a pressure grease fitting in said opening having a portion extending above said shorter leaf dimensioned to pass through said opening and a laterally enlarged portion beyond the top of said opening engageable with the surface of said shorter leaf adjacent said longer leaf to prevent outward removal of said fitting, whereby said fitting may be removed from said opening upon disassembly of said leaves and is retained in assembled position in said opening by engagement with the adjacent surface of said longer leaf.

10. Spring construction for motor vehicles comprising an assembly of leaf springs of progressively stepped lengths, means for applying lubrication under pressure to the surfaces adjacent the end of a shorter leaf and the contiguous surface of the next longer leaf, said shorter leaf having a transverse opening therethrough adjacent its end, said opening being flared at its end next to the longer leaf, said means comprising a pressure grease fitting in said opening having a portion extending above said shorter leaf and an adaptor in which said fitting is secured, said adaptor having a laterally extending portion engageable with the flared surface of said opening to retain said adaptor and fitting in position.

JOHN L. SEARLE.

REFERENCES CITED

The following references are of record in the file of this patent:

UNITED STATES PATENTS

| Number | Name | Date |
|---|---|---|
| 1,185,134 | Rumney | May 30, 1916 |
| 1,325,431 | Wise | Dec. 16, 1919 |
| 1,371,003 | Simmons | Mar. 8, 1921 |
| 1,620,301 | Thide | Mar. 8, 1927 |

FOREIGN PATENTS

| Number | Country | Date |
|---|---|---|
| 391,574 | Great Britain | May 4, 1933 |
| 700,635 | France | Jan. 2, 1931 |